(12) United States Patent
Su

(10) Patent No.: US 8,860,350 B2
(45) Date of Patent: Oct. 14, 2014

(54) MOTOR DRIVING APPARATUS WITH ROTATIONAL SPEED LIMITATION FUNCTION AND FAN APPARATUS WITH ROTATIONAL SPEED LIMITATION FUNCTION

(71) Applicant: Enermax Technology Corporation, Taoyuan (TW)

(72) Inventor: Yen-Wen Su, Taoyuan (TW)

(73) Assignee: Enermax Technology Corporation, Taoyuan, Taoyuan County (TW)

( * ) Notice: Subject to any disclaimer, the term of this patent is extended or adjusted under 35 U.S.C. 154(b) by 149 days.

(21) Appl. No.: 13/645,047

(22) Filed: Oct. 4, 2012

(65) Prior Publication Data

US 2014/0097770 A1 Apr. 10, 2014

(51) Int. Cl.
*H02P 7/06* (2006.01)
*H02P 1/26* (2006.01)

(52) U.S. Cl.
USPC ........... 318/461; 318/268; 318/249; 318/471; 388/803; 388/804; 417/42

(58) Field of Classification Search
USPC ........ 318/3, 461, 249, 268, 432, 772, 400.11, 318/400.13, 400.34, 471; 388/803, 804; 417/42
See application file for complete search history.

(56) References Cited

U.S. PATENT DOCUMENTS

| | | | | |
|---|---|---|---|---|
| 6,060,849 A * | 5/2000 | Tai et al. | ........................ | 318/432 |
| 6,125,798 A * | 10/2000 | Kuwayama et al. | ........ | 123/41.12 |
| 6,239,991 B1 * | 5/2001 | Ajro et al. | ........................ | 363/41 |
| 6,259,172 B1 * | 7/2001 | Lee | ................ | 307/125 |
| 6,274,991 B1 * | 8/2001 | Busch | ........................ | 318/400.32 |
| 6,329,727 B1 * | 12/2001 | Traveis et al. | ................ | 307/115 |
| 6,333,610 B1 * | 12/2001 | Meschik et al. | ......... | 318/400.14 |
| 7,038,408 B2 * | 5/2006 | Lin et al. | ........................ | 318/268 |
| 7,187,853 B2 * | 3/2007 | Mayer | ........................ | 388/803 |
| 8,193,744 B2 * | 6/2012 | Steiner et al. | ................ | 318/249 |
| 8,436,566 B2 * | 5/2013 | Hu | ................ | 318/461 |
| 2003/0234630 A1 * | 12/2003 | Blake | ........................ | 318/471 |
| 2005/0002656 A1 * | 1/2005 | Mayer | ........................ | 388/804 |
| 2005/0040778 A1 * | 2/2005 | Lin et al. | ........................ | 318/268 |
| 2005/0264253 A1 * | 12/2005 | Ivankovic | ........................ | 318/685 |
| 2010/0109597 A1 * | 5/2010 | Steiner et al. | ................ | 318/772 |
| 2012/0194115 A1 * | 8/2012 | Hu | ........................ | 318/461 |

* cited by examiner

*Primary Examiner* — Paul Ip

(74) *Attorney, Agent, or Firm* — Muncy, Geissler, Olds & Lowe, P.C.

(57) ABSTRACT

A motor driving apparatus is applied to a fan and motor mechanism and a voltage supply unit. The motor driving apparatus includes a motor driving unit, a voltage division resistor, a first resistor, a first switch unit, a second resistor, a second switch unit, a third resistor, a third switch unit, a transistor switch, and a pulse width modulation unit. The first switch unit, the second switch unit, and the third switch unit are configured to select the rotational speed upper limitation of the fan and motor mechanism for suppressing noise.

10 Claims, 5 Drawing Sheets

MOTOR DRIVING APPARATUS WITH ROTATIONAL SPEED LIMITATION FUNCTION AND FAN APPARATUS WITH ROTATIONAL SPEED LIMITATION FUNCTION

BACKGROUND OF THE INVENTION

1. Field of the Invention

The present invention relates to a motor driving apparatus and a fan apparatus, and especially relates to a motor driving apparatus with rotational speed limitation function and a fan apparatus with rotational speed limitation function.

2. Description of Prior Art

Fans are used massively by modern people for ventilating or cooling. It is inconvenient for life or technology without fans.

The noise made by the fan when operating can't be neglected although the fan is important. Generally speaking, the noise made by the fan is louder if the rotational speed of the fan is faster. Therefore, in order to suppress noise, it is important to research and develop a fan with rotational speed limitation function.

SUMMARY OF THE INVENTION

In order to solve the above-mentioned problems, an object of the present invention is to provide a motor driving apparatus with rotational speed limitation function.

In order to solve the above-mentioned problems, another object of the present invention is to provide a fan apparatus with rotational speed limitation function.

In order to achieve the object of the present invention mentioned above, the motor driving apparatus is applied to a fan and motor mechanism and a voltage supply unit. The motor driving apparatus includes a motor driving unit, a voltage division resistor, a first resistor, a first switch unit, a second resistor, a second switch unit, a transistor switch, and a pulse width modulation unit. The motor driving unit is electrically connected to the fan and motor mechanism and the voltage supply unit. One side of the voltage division resistor is electrically connected to the voltage supply unit. The other side of the voltage division resistor is electrically connected to the motor driving unit. One side of the first resistor is electrically connected to the other side of the voltage division resistor. One side of the first switch unit is electrically connected to the other side of the first resistor. One side of the second resistor is electrically connected to the other side of the voltage division resistor. One side of the second switch unit is electrically connected to the other side of the second resistor. A first side of the transistor switch is electrically connected to the other side of the voltage division resistor. The pulse width modulation unit is electrically connected to a second side of the transistor switch.

In order to achieve the other object of the present invention mentioned above, the fan apparatus is applied to a voltage supply unit and a fan base. The fan apparatus includes a fan and motor mechanism, a motor driving unit, a voltage division resistor, a selection switch, a transistor switch, and a pulse width modulation unit. The motor driving unit is electrically connected to the fan and motor mechanism and the voltage supply unit. One side of the voltage division resistor is electrically connected to the voltage supply unit. The other side of the voltage division resistor is electrically connected to the motor driving unit. The selection switch is electrically connected to the voltage supply unit, the voltage division resistor, and the motor driving unit. A first side of the transistor switch is electrically connected to the other side of the voltage division resistor. The pulse width modulation unit is electrically connected to a second side of the transistor switch. The selection switch includes a first resistor, a first switch unit, a second resistor, and a second switch unit. One side of the first resistor is electrically connected to the other side of the voltage division resistor. One side of the first switch unit is electrically connected to the other side of the first resistor. One side of the second resistor is electrically connected to the other side of the voltage division resistor. One side of the second switch unit is electrically connected to the other side of the second resistor.

DETAILED DESCRIPTION OF THE INVENTION

Figure 1:
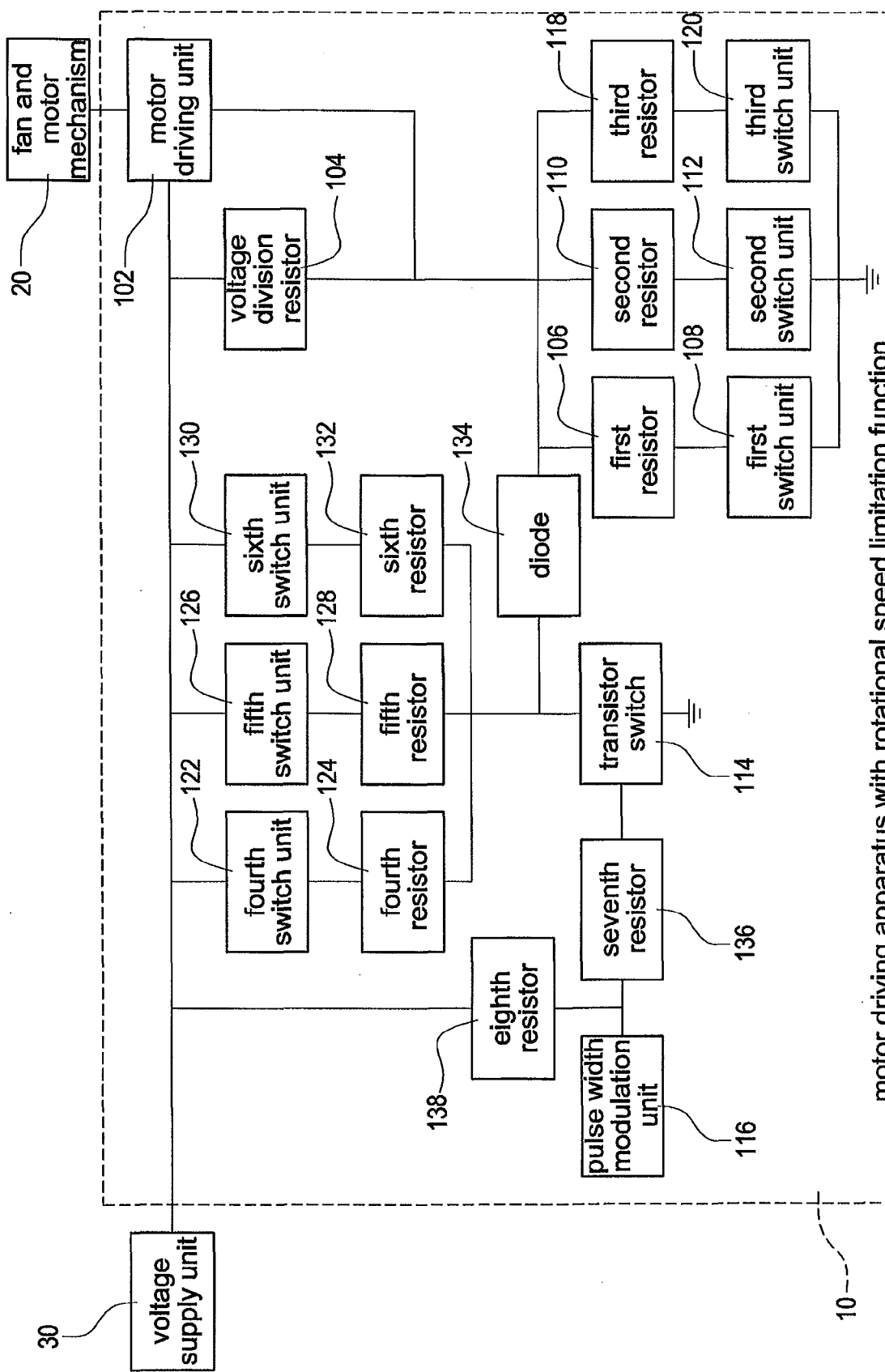
FIG. 1 shows a block diagram of the motor driving apparatus with rotational speed limitation function of the present invention.

FIG. 1 shows a block diagram of the motor driving apparatus with rotational speed limitation function of the present invention. A motor driving apparatus 10 is applied to a fan and motor mechanism 20 and a voltage supply unit 30. The motor driving apparatus 10 includes a motor driving unit 102, a voltage division resistor 104, a first resistor 106, a first switch unit 108, a second resistor 110, a second switch unit 112, a transistor switch 114, a pulse width modulation unit 116, a third resistor 118, a third switch unit 120, a fourth switch unit 122, a fourth resistor 124, a fifth switch unit 126, a fifth resistor 128, a sixth switch unit 130, a sixth resistor 132, a diode 134, a seventh resistor 136, and an eighth resistor 138.

The motor driving unit 102 is electrically connected to the fan and motor mechanism 20 and the voltage supply unit 30. One side of the voltage division resistor 104 is electrically connected to the voltage supply unit 30. The other side of the voltage division resistor 104 is electrically connected to the motor driving unit 102. One side of the first resistor 106 is electrically connected to the other side of the voltage division resistor 104. One side of the first switch unit 108 is electrically connected to the other side of the first resistor 106. One side of the second resistor 110 is electrically connected to the other side of the voltage division resistor 104. One side of the second switch unit 112 is electrically connected to the other side of the second resistor 110. A first side of the transistor switch 114 is electrically connected to the other side of the voltage division resistor 104. The pulse width modulation unit 116 is electrically connected to a second side of the transistor switch 114. One side of the third resistor 118 is electrically connected to the other side of the voltage division resistor 104. One side of the third switch unit 120 is electrically connected to the other side of the third resistor 118. One side of the fourth switch unit 122 is electrically connected to the voltage supply unit 30. One side of the fourth resistor 124 is electrically connected to the other side of the fourth switch unit 122. The other side of the fourth resistor 124 is electrically connected to the first side of the transistor switch 114.

One side of the fifth switch unit 126 is electrically connected to the voltage supply unit 30. One side of the fifth resistor 128 is electrically connected to the other side of the fifth switch unit 126. The other side of the fifth resistor 128 is electrically connected to the first side of the transistor switch 114. One side of the sixth switch unit 130 is electrically connected to the voltage supply unit 30. One side of the sixth resistor 132 is electrically connected to the other side of the sixth switch unit 130. The other side of the sixth resistor 132 is electrically connected to the first side of the transistor switch 114. A cathode of the diode 134 is electrically connected to the other side of the voltage division resistor 104. An anode of the diode 134 is electrically connected to the first side of the transistor switch 114. One side of the seventh resistor 136 is electrically connected to the pulse width modulation unit 116. The other side of the seventh resistor 136 is electrically connected to the second side of the transistor switch 114. One side of the eighth resistor 138 is electrically connected to the voltage supply unit 30. The other side of the eighth resistor 138 is electrically connected to one side of the seventh resistor 136.

The first switch unit 108, the second switch unit 112, and the third switch unit 120 are configured to select the rotational speed upper limitation of the fan and motor mechanism 20 for suppressing noise. For example, the rotational speed upper limitation of the fan and motor mechanism 20 is 1200 rpm if the first switch unit 108 is selected (closed or operated). The rotational speed upper limitation of the fan and motor mechanism 20 is 1600 rpm if the second switch unit 112 is selected (closed or operated). The rotational speed upper limitation of the fan and motor mechanism 20 is 2000 rpm if the third switch unit 120 is selected (closed or operated).

Figure 3:
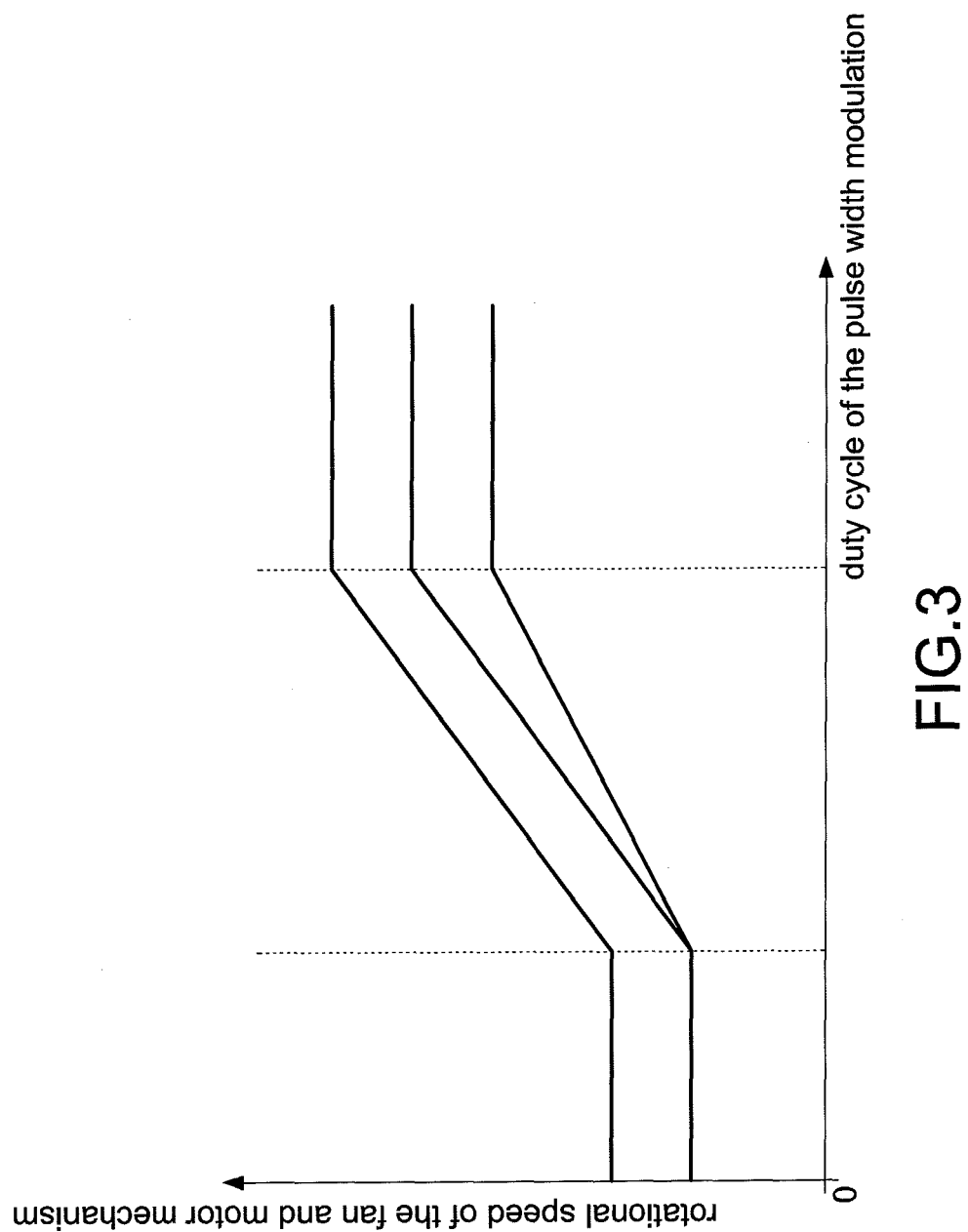
FIG. 3 is a curve diagram of the rotational speed of the fan and motor mechanism versus the duty cycle of the pulse width modulation.

FIG. 3 is a curve diagram of the rotational speed of the fan and motor mechanism versus the duty cycle of the pulse width modulation. The fourth switch unit 122, the fifth switch unit 126, and the sixth switch unit 130 are configured to adjust the initial rotational speed of the fan and motor mechanism 20, so that the curve of the present invention in FIG. 3 is various. In FIG. 3, the upper curve is for prior art. The present invention includes the three curves in FIG. 3. Therefore, the curves of the rotational speed of the fan and motor mechanism 20 versus the duty cycle of the pulse width modulation are more various than prior art.

Figure 2:
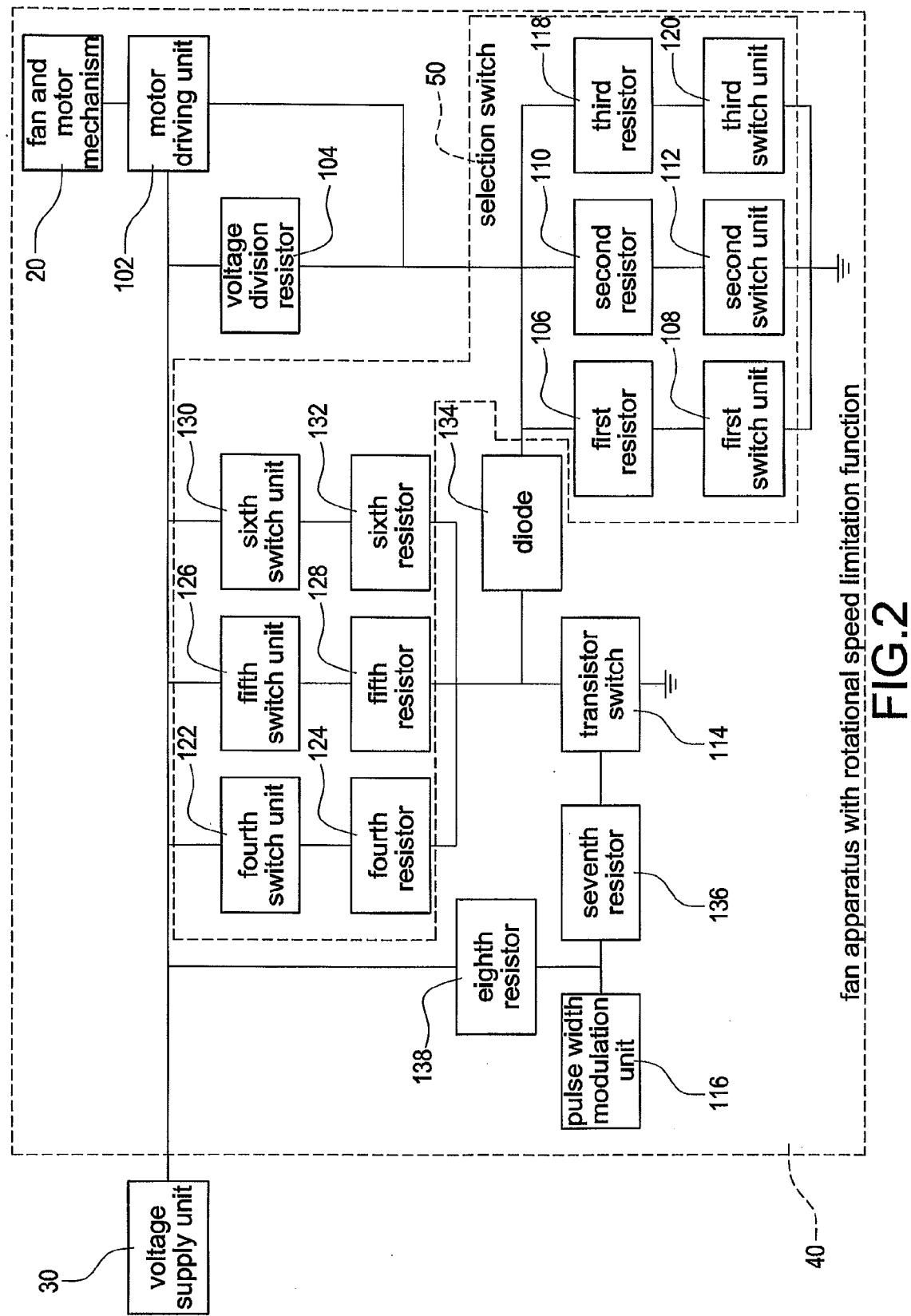
FIG. 2 shows a block diagram of the fan apparatus with rotational speed limitation function of the present invention.
Figure 4:
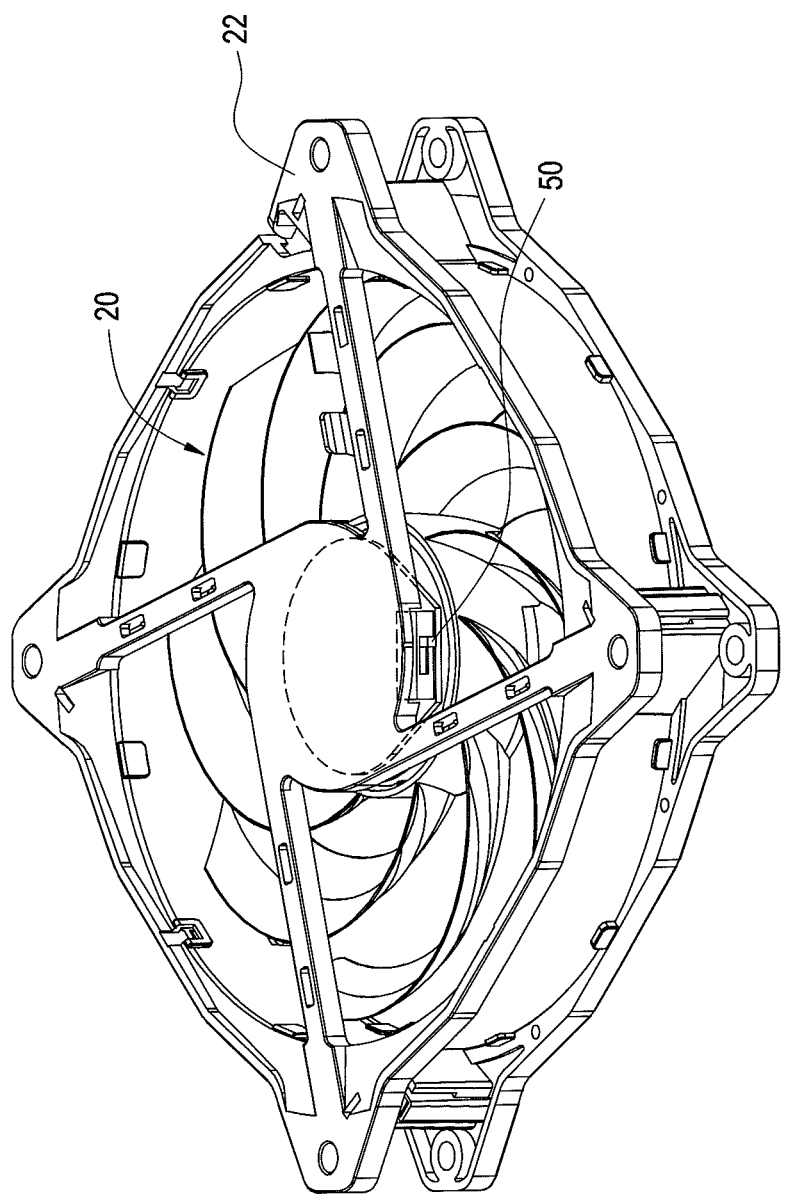
FIG. 4 is an appearance diagram of an embodiment of the present invention.
Figure 5:
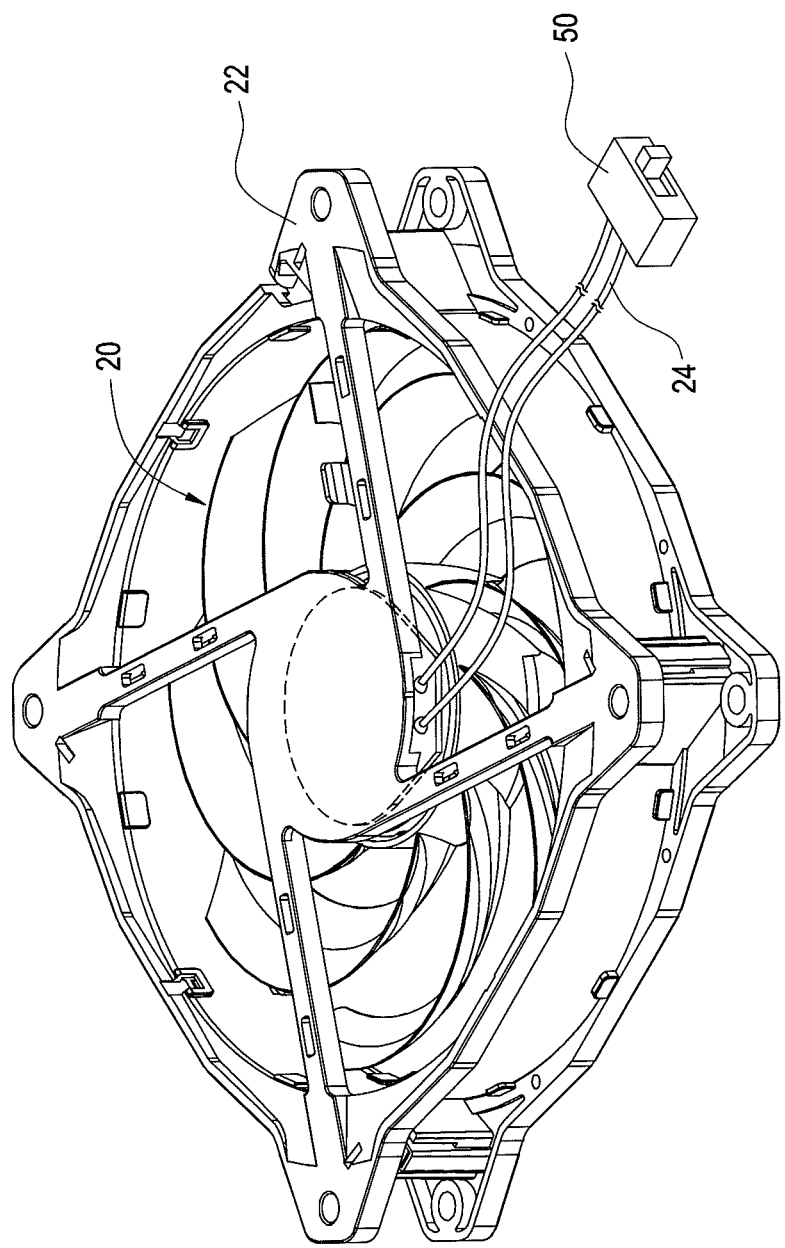
FIG. 5 is an appearance diagram of another embodiment of the present invention.

FIG. 2 shows a block diagram of the fan apparatus with rotational speed limitation function of the present invention. A fan apparatus 40 is applied to a voltage supply unit 30 and a fan base 22 (as shown in FIG. 4 or FIG. 5). The fan apparatus 40 includes a fan and motor mechanism 20, a motor driving unit 102, a voltage division resistor 104, a selection switch 50, a transistor switch 114, a pulse width modulation unit 116, a diode 134, a seventh resistor 136, and an eighth resistor 138.

The selection switch 50 includes a first resistor 106, a first switch unit 108, a second resistor 110, a second switch unit 112, a third resistor 118, a third switch unit 120, a fourth switch unit 122, a fourth resistor 124, a fifth switch unit 126, a fifth resistor 128, a sixth switch unit 130, and a sixth resistor 132. The selection switch 50 is electrically connected to the voltage supply unit 30, the fifth resistor 128, and the motor driving unit 102. The electrical connections, the efficiency, and the operations of the components in FIG. 2 are the same as the contents in FIG. 1, so that it is omitted.

FIG. 4 is an appearance diagram of an embodiment of the present invention. In FIG. 4, the selection switch 50 is configured to switch and control whether the first switch unit 108, the second switch unit 112, or the third switch unit 120 is selected to be closed (or operated), so that the rotational speed upper limitation of the fan and motor mechanism 20 is selected. Therefore, the noise made by the fan and motor mechanism 20 is suppressed. The fourth switch unit 122 is closed (or operated) when the first switch unit 108 is selected to be closed (or operated). The fifth switch unit 126 is closed (or operated) when the second switch unit 112 is selected to be closed (or operated). The sixth switch unit 130 is closed (or operated) when the third switch unit 120 is selected to be closed (or operated). In FIG. 4, the selection switch 50 is fixed at the fan base 22. However, the selection switch 50 can be connected with electric wires as shown in FIG. 5.

FIG. 5 is an appearance diagram of another embodiment of the present invention. In FIG. 5, the contents the same as in FIG. 4 are omitted. The fan apparatus 40 further includes an electric wire set 24. One side of the electric wire set 24 is electrically connected to the voltage supply unit 30, the voltage division resistor 104, and the motor driving unit 102. The other side of the electric wire set 24 is electrically connected to the selection switch 50.

Moreover, the method for controlling (selecting) the rotational speed upper limitation of the fan and motor mechanism 20 can be achieved by connecting rotational speed adjustment circuits (for examples, resistors or other circuits) on a motor winding. Different rotational speed adjustment circuits are configured to result in different rotational speed upper limitations. The rotational speed adjustment circuits can be arranged behind the motor winding as well.

Although the present invention has been described with reference to the preferred embodiment thereof, it will be understood that the invention is not limited to the details thereof Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A motor driving apparatus applied to a fan and motor mechanism and a voltage supply unit, the motor driving apparatus including:
   a motor driving unit electrically connected to the fan and motor mechanism and the voltage supply unit;
   a voltage division resistor, one side of the voltage division resistor electrically connected to the voltage supply unit, the other side of the voltage division resistor electrically connected to the motor driving unit;
   a first resistance adjustment module, one side of the first resistance adjustment module electrically connected to the other side of the voltage division resistor;
   a diode, a cathode of the diode electrically connected to the other side of the voltage division resistor and one side of the first resistance adjustment module;
   a second resistance adjustment module, one side of the second resistance adjustment module electrically connected to the voltage supply unit, the other side of the second resistance adjustment module electrically connected to an anode of the diode;
   a transistor switch, a first side of the transistor switch electrically connected to the anode of the diode and the other side of the second resistance adjustment module;
   a pulse width modulation unit; and
   a seventh resistor, one side of the seventh resistor electrically connected to the pulse width modulation unit, the other side of the seventh resistor electrically connected to a second side of the transistor switch,
   wherein the first resistance adjustment module comprises:
   a first resistor, one side of the first resistor electrically connected to the other side of the voltage division resistor and the cathode of the diode;

a first switch unit, one side of the first switch unit electrically connected to the other side of the first resistor;
a second resistor, one side of the second resistor electrically connected to the other side of the voltage division resistor and the cathode of the diode;
a second switch unit, one side of the second switch unit electrically connected to the other side of the second resistor,
wherein the second resistance adjustment module comprises:
a fourth switch unit, one side of the fourth switch unit electrically connected to the voltage supply unit;
a fourth resistor, one side of the fourth resistor electrically connected to the other side of the fourth switch unit, the other side of the fourth resistor electrically connected to the first side of the transistor switch and the anode of the diode;
a fifth switch unit, one side of the fifth switch unit electrically connected to the voltage supply unit;
a fifth resistor, one side of the fifth resistor electrically connected to the other side of the fifth switch unit, the other side of the fifth resistor electrically connected to the first side of the transistor switch and the anode of the diode,
wherein the first resistance adjustment module is electrically connected to the second resistance adjustment module in series; turning on or off the first switch unit and the second switch unit determines a resistance value of the first resistance adjustment module; turning on or off the fourth switch unit and the fifth switch unit determines a resistance value of the second resistance adjustment module.

2. The motor driving apparatus in claim 1, wherein the first resistance adjustment module further comprises:
a third resistor, one side of the third resistor electrically connected to the other side of the voltage division resistor and the cathode of the diode; and
a third switch unit, one side of the third switch unit electrically connected to the other side of the third resistor.

3. The motor driving apparatus in claim 2, wherein the second resistance adjustment module further comprises:
a sixth switch unit, one side of the sixth switch unit electrically connected to the voltage supply unit; and
a sixth resistor, one side of the sixth resistor electrically connected to the other side of the sixth switch unit, the other side of the sixth resistor electrically connected to the first side of the transistor switch and the anode of the diode.

4. The motor driving apparatus in claim 3 further including:
an eighth resistor, one side of the eighth resistor electrically connected to the voltage supply unit, the other side of the eighth resistor electrically connected to one side of the seventh resistor.

5. A fan apparatus applied to a voltage supply unit and a fan base, the fan apparatus including:
a fan and motor mechanism;
a motor driving unit electrically connected to the fan and motor mechanism and the voltage supply unit;
a voltage division resistor, one side of the voltage division resistor electrically connected to the voltage supply unit, the other side of the voltage division resistor electrically connected to the motor driving unit;
a selection switch electrically connected to the voltage supply unit, the voltage division resistor, and the motor driving unit;
a diode, a cathode of the diode electrically connected to the selection switch, an anode of the diode electrically connected to the selection switch;
a transistor switch, a first side of the transistor switch electrically connected to the selection switch and the anode of the diode;
a pulse width modulation unit; and
a seventh resistor, one side of the seventh resistor electrically connected to the pulse width modulation unit, the other side of the seventh resistor electrically connected to the second side of the transistor switch,
wherein the selection switch includes:
a first resistance adjustment module; and
a second resistance adjustment module,
wherein the first resistance adjustment module comprises:
a first resistor, one side of the first resistor electrically connected to the other side of the voltage division resistor and the cathode of the diode;
a first switch unit, one side of the first switch unit electrically connected to the other side of the first resistor;
a second resistor, one side of the second resistor electrically connected to the other side of the voltage division resistor and the cathode of the diode; and
a second switch unit, one side of the second switch unit is electrically connected to the other side of the second resistor,
wherein the second resistance adjustment module comprises:
a fourth switch unit, one side of the fourth switch unit electrically connected to the voltage supply unit;
a fourth resistor, one side of the fourth resistor electrically connected to the other side of the fourth switch unit, the other side of the fourth resistor electrically connected to the first side of the transistor switch and the anode of the diode;
a fifth switch unit, one side of the fifth switch unit electrically connected to the voltage supply unit;
a fifth resistor, one side of the fifth resistor electrically connected to the other side of the fifth switch unit, the other side of the fifth resistor electrically connected to the first side of the transistor switch and the anode of the diode,
wherein the first resistance adjustment module is electrically connected to the second resistance adjustment module in series; turning on or off the first switch unit and the second switch unit determines a resistance value of the first resistance adjustment module; turning on or off the fourth switch unit and the fifth switch unit determines a resistance value of the second resistance adjustment module.

6. The fan apparatus in claim 5, wherein the first resistance adjustment module further includes:
a third resistor, one side of the third resistor electrically connected to the other side of the voltage division resistor and the cathode of the diode; and
a third switch unit, one side of the third switch unit electrically connected to the other side of the third resistor.

7. The fan apparatus in claim 6, wherein the second resistance adjustment module further includes:
a sixth switch unit, one side of the sixth switch unit electrically connected to the voltage supply unit; and
a sixth resistor, one side of the sixth resistor electrically connected to the other side of the sixth switch unit, the other side of the sixth resistor electrically connected to the first side of the transistor switch and the anode of the diode.

8. The fan apparatus in claim 7, further including:
an eighth resistor, one side of the eighth resistor electrically connected to the voltage supply unit, the other side of the eighth resistor electrically connected to one side of the seventh resistor.

9. The fan apparatus in claim 8, wherein the selection switch is fixed at the fan base.

10. The fan apparatus in claim 8 further including an electric wire set, one side of the electric wire set electrically connected to the voltage supply unit, the voltage division resistor, and the motor driving unit, the other side of the electric wire set electrically connected to the selection switch.

* * * * *